H. M. COLLIER.
Car-Brake Shoe.
No. 18,435.  Patented Oct. 20, 1857.
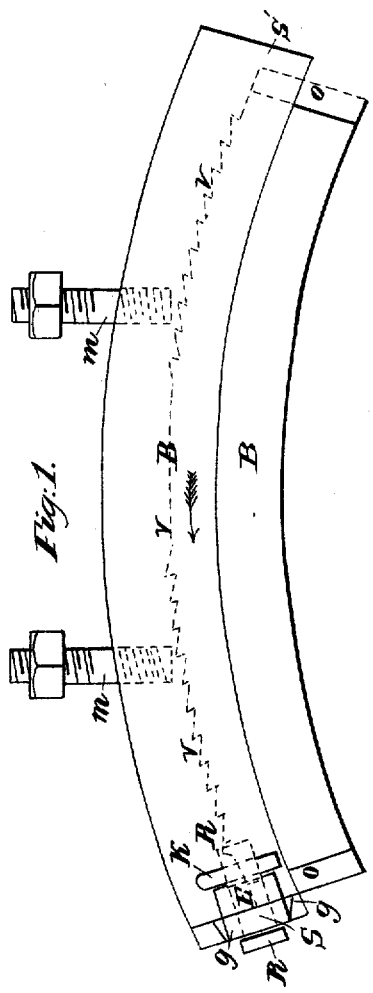
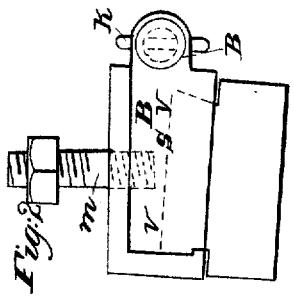
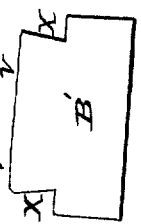
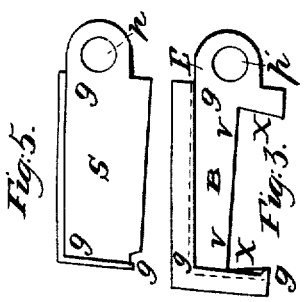
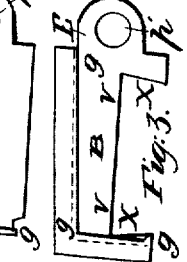
Witnesses
Inventor
H. M. Collier

UNITED STATES PATENT OFFICE.

HENRY M. COLLIER, OF BINGHAMTON, NEW YORK.

IMPROVEMENT IN THE RUBBERS OF RAILROAD-CAR BRAKES.

Specification forming part of Letters Patent No. 18,435, dated October 20, 1857.

*To all whom it may concern:*

Be it known that I, HENRY M. COLLIER, of Binghamton, in the county of Broome and State of New York, have invented an Improvement in Rubbers for Railroad - Car Brakes; and I do hereby declare the following to be a clear and accurate description of my invention, reference being had to the accompanying drawings, in which the several letters in the different figures refer to corresponding portions or parts.

Figure 1 represents a side or longitudinal plan of the cast-iron head and wooden shoe, (drawn to a scale of six inches to the foot;) Fig. 2, an end plan of same; Fig. 3, an end plan of cast-iron head alone; Fig. 4, an end plan of wooden shoe or rubber; Fig. 5, the sliding cap fitting one end of cast head.

I construct B portion of Figs. 1 and 2 of cast-iron or some like permanent material of a circular form corresponding with the periphery or tread of the car-wheel, with a recess on the side toward the wheel of about three-fourths of an inch in depth and the length of the shoe (except one-half an inch at one end S', which is cast solid to secure the wooden shoe B' in that direction.) This recess has its sides cast of a dovetail or mitered form its entire length to confine the wooden rubber, as is represented at X X in end plan, Fig. 3. The back of this recess V V, Figs. 1 and 2, is cast solid and of a circular form corresponding to the periphery of the car-wheel, which form affords an unyielding support to the fibers or grain of the wooden shoe B', unaffected by any shrinkage of the same, and serves to relieve the cap S and end S' from the strain caused by the carrying tendency of the friction with the wheel in the direction of its motion; and to further accomplish this last-mentioned object I serrate the surface of said back V V, which serrated surface, together with the circular form above mentioned, almost entirely relieves the cap S and end S'.

B' is a wooden shoe or rubber about fourteen inches long, three inches wide, and two inches deep sawed so as to form an arc of a circle corresponding with the periphery or tread of the wheel, which I saw or cut out of three-inch plank across the grain. I saw or cut a dovetail about three-quarters of an inch in depth the entire length on the upper side of B', as is represented at X X in end plan, Fig. 4, which will correspond and fit to X X, Fig. 3.

Fitted to the mitered sides and back of the recess I use supplementary plates O O, of cast or wrought iron of about one-half an inch in thickness of the same form as a section of wooden shoe B', which plates are renewed with the shoe and which act as scrapers to remove ice or other obstructions, which might otherwise injure the efficiency of the wooden shoe as a friction-surface, and thus I combine with the wooden rubber the advantages of the iron rubber in that particular.

The sliding cap S (which is represented in Fig. 5) fits into one end of head B, secured in place by dovetail $g$, Fig. 1, and represented by dotted line $g$, Fig. 3, and is further secured by bolt R, passing through the holes $p$ in S, Fig. 5, and $p'$ in the ear E, Fig. 3, cast on head B, the bolt R being secured by key $k$.

Bolts $m$ $m$ are for fastening the entire shoe B B' to the frame of the brake.

To renew the rubber B' and plates O O when worn out, the process is as follows: The key $k$ is withdrawn to allow the removal of the bolt R, which releases the sliding cover or cap S, which being removed the wooden shoe or rubber B' can readily be slid out of the cast-iron head B in the direction of the arrow, Fig. 1, and be replaced by a new rubber B', previously sawed and prepared as above. The plates O O are withdrawn and renewed at the same time and in the same manner. The cap S is then replaced and secured as represented in end plan, Fig. 2, and side plan, Fig. 1.

In the renewal of worn wooden shoes or rubbers of the ordinary construction more material is thrown away as worthless than I require for one of my new shoes.

I do not claim a metallic head or socket to hold the wooden shoe or rubber; nor a wooden shoe or rubber presenting the end of grain or fiber as a friction-surface; nor the scrapers O O; nor a dovetail for securing a removable piece, as heretofore used or described; but What I do claim as original and my invention, and what I desire to secure by Letters Patent, is—

The serrated circular back V V of recess in B and the sliding cap S, as described, and for the purposes set forth.

H. M. COLLIER.

Witnesses:
D. S. DICKINSON,
A. BIRDSALL.